United States Patent
Burke et al.

(10) Patent No.: US 9,813,007 B2
(45) Date of Patent: Nov. 7, 2017

(54) CONTROL SYSTEM FOR AN ELECTRIC MOTOR

(71) Applicant: PROTEAN ELECTRIC LIMITED, Surrey (GB)

(72) Inventors: Richard Burke, Hook (GB); Anthony Morrell, Devizes (GB); Timothy Martin, Reading (GB)

(73) Assignee: PROTEAN ELECTRIC LIMITED (GB)

( * ) Notice: Subject to any disclaimer, the term of this patent is extended or adjusted under 35 U.S.C. 154(b) by 0 days.

(21) Appl. No.: 14/780,037

(22) PCT Filed: Apr. 11, 2014

(86) PCT No.: PCT/IB2014/060662
§ 371 (c)(1),
(2) Date: Sep. 25, 2015

(87) PCT Pub. No.: WO2014/167547
PCT Pub. Date: Oct. 16, 2014

(65) Prior Publication Data
US 2016/0049894 A1   Feb. 18, 2016

(30) Foreign Application Priority Data

Apr. 12, 2013 (GB) .................................. 1306678.2

(51) Int. Cl.
*H02M 5/40* (2006.01)
*H02P 25/22* (2006.01)
(Continued)

(52) U.S. Cl.
CPC ............. *H02P 25/22* (2013.01); *H02K 11/33* (2016.01); *H02P 27/08* (2013.01)

(58) Field of Classification Search
CPC .. H02P 25/22; H02P 27/08; H02P 5/00; H02P 9/02; H02P 2101/45; H02P 25/188;
(Continued)

(56) References Cited

U.S. PATENT DOCUMENTS 4,349,772 A * 9/1982 Weiss .................... H02P 27/045
318/798
4,455,522 A * 6/1984 Lipo ..................... H02P 27/048
318/807
(Continued)

FOREIGN PATENT DOCUMENTS

GB 2462940 A * 3/2010 ............... H02K 3/28
GB 2494797 * 3/2013 ............. H02P 25/22
(Continued)

OTHER PUBLICATIONS

European Patent Office; International Search Report; dated Oct. 14, 2013; World Intellectual Property Organization; Rijswijk.
(Continued)

*Primary Examiner* — Rita Leykin
(74) *Attorney, Agent, or Firm* — Valerie M. Davis; The Mason Group Patent Specialists, LLC

(57) ABSTRACT

A control system for an electric motor, the control system comprising a first control device arranged to control an operation of a first component of the electric motor; a second control device arranged to control an operation of a second component of the electric motor, wherein the first control device is arranged to transmit to the second control device a first signal for indicating the transmission of data over a first communication link to the second control device, wherein the second control device is arranged to use the timing of the first signal to synchronize the operation of the second component with the operation of the first component.

13 Claims, 5 Drawing Sheets

(51) Int. Cl.
*H02P 27/08* (2006.01)
*H02K 11/33* (2016.01)

(58) Field of Classification Search
CPC .... H02P 9/04; H02P 9/107; H02P 9/14; H02P 9/30; H02P 9/48; H02K 11/33; B23K 9/1062; F02B 2063/045; F02B 2063/046; F02B 63/04; F02B 63/044; F02B 75/16
USPC ........ 318/496, 599, 34, 801; 322/90; 307/32
See application file for complete search history.

(56) References Cited

U.S. PATENT DOCUMENTS

| | | | | | |
|---|---|---|---|---|---|
| 4,520,300 | A * | 5/1985 | Fradella | ............... | G05B 19/104 310/268 |
| 5,084,791 | A * | 1/1992 | Thanos | ............... | G11B 5/5556 360/77.03 |
| 5,223,775 | A * | 6/1993 | Mongeau | ............... | H02P 6/10 318/400.38 |
| 5,705,909 | A * | 1/1998 | Rajashekara | ....... | B60L 11/1803 318/801 |
| 6,526,535 | B1 * | 2/2003 | Warren | ............ | G01R 31/31855 714/727 |
| 6,676,400 | B2 * | 1/2004 | Ito | ............... | B29C 45/76 318/801 |
| 7,224,145 | B2 * | 5/2007 | Pierret | ............... | F02N 11/04 322/25 |
| 7,439,697 | B2 * | 10/2008 | Miyazaki | ............... | B60L 11/123 310/112 |
| 7,466,086 | B2 * | 12/2008 | Kiuchi | ............... | H02P 5/74 318/400.07 |
| 7,504,784 | B2 * | 3/2009 | Asada | ............... | D06F 37/304 318/400.02 |
| 7,514,813 | B2 * | 4/2009 | McKelvey | ............... | H02J 3/46 307/32 |
| 7,701,154 | B2 * | 4/2010 | Oesterreicher | ......... | B60L 1/006 318/105 |
| 7,705,689 | B2 * | 4/2010 | Harrison | ............... | H03K 7/08 332/109 |
| 7,880,424 | B2 * | 2/2011 | Seguchi | ............... | H02K 21/042 318/523 |
| 7,956,563 | B2 * | 6/2011 | Perisic | ............... | B60L 11/1868 180/65.1 |
| 7,990,098 | B2 * | 8/2011 | Perisic | ............... | B60L 11/1868 318/432 |
| 8,125,168 | B2 * | 2/2012 | Johnson | ............... | H02P 6/14 318/400.01 |
| 8,397,502 | B2 * | 3/2013 | Barker | ............... | F01P 7/046 290/4 C |
| 8,604,766 | B2 * | 12/2013 | Shiraishi | ............... | G05F 1/468 323/283 |
| 8,638,003 | B2 * | 1/2014 | Hashimoto | ............ | F02D 29/06 290/27 |
| 8,749,192 | B2 * | 6/2014 | Li | ............... | H02K 3/28 318/799 |
| 8,766,603 | B2 * | 7/2014 | Hashimoto | ............ | H02P 25/22 322/89 |
| 8,923,346 | B2 * | 12/2014 | Li | ............... | G04G 7/02 370/510 |
| 9,077,207 | B2 * | 7/2015 | Hashimoto | ............... | H02J 3/40 |
| 9,086,044 | B2 * | 7/2015 | Hashimoto | ............ | F02N 11/08 |
| 9,231,513 | B2 * | 1/2016 | Baba | ............... | H02P 25/021 |
| 9,258,166 | B2 * | 2/2016 | Yan | ............... | H04L 27/2662 |
| 9,325,271 | B2 * | 4/2016 | Hashimoto | ............ | H02P 25/22 |
| 9,509,246 | B2 * | 11/2016 | Burke | ............... | H02K 11/33 |
| 2012/0014147 | A1 | 1/2012 | Radosevich | | |

FOREIGN PATENT DOCUMENTS

GB 2494797 A 3/2013
JP 2008228548 A 9/2008

OTHER PUBLICATIONS

Intellectual Property Office; Combined Search and Examination Report; dated Oct. 14, 2013; Intellectual Property Office; South Wales.

Intellectual Property Office; Search Report; dated Oct. 16, 2014; Intellectual Property Office; South Wales.

* cited by examiner

CONTROL SYSTEM FOR AN ELECTRIC MOTOR

The present invention relates to a control system, in particular a control system for an electric motor.

Electric motor systems typically include an electric motor and a control unit arranged to control the power/torque generated by the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

Typically, the three phase bridge inverter will generate a three phase voltage supply using a form of pulse width modulation (PWM) voltage control. PWM control works by using the motor inductance to average out an applied pulse voltage to drive the required current into the motor coils. Using PWM control an applied voltage is switched across the motor coils. During this on period, the current rises in the motor coils at a rate dictated by its inductance and the applied voltage. The PWM control is then required to switch off before the current has changed too much so that precise control of the current is achieved.

A three phase bridge inverter includes a number of switching devices, for example power electronic switches such as Insulated Gate Bipolar Transistor (IGBT) switches.

However, power electronic switches will typically exhibit switching losses and conduction losses.

Including switching losses and conduction losses, the total losses are approximately proportional to the square of the power. This can impose serious thermal management problems for the motor and inverter since, for example, a doubling of the power leads to a fourfold increase in thermal losses. Extracting this heat without elevating the temperature of the device above its safe operating level becomes the limiting factor in the amount of power the device can handle. Indeed, today larger power devices having intrinsic current handling capabilities of, for example, 500 A are restricted to 200 A due to thermal constraints.

For a conventional three phase motor with a given power rating, if a larger power rating is desired this can be achieved by producing a motor with a larger diameter. For a larger motor diameter, the peripheral speed of the rotor increases for a given angular velocity. However, for a given supply voltage this requires that the motor coils have a reduced number of turns.

One solution that has been proposed to overcome this limitation has been the development of electric motors having a number of sub-motors that can operate independently of each other, where the current flow in the coil sub-sets of one sub-motor is independent of the current flow in the coil sub-sets of another sub-motor (i.e. the respective coil sub-sets are not connected in series). Consequently, the coils of each coil sub-set can have a larger number of turns than for an equivalent motor in which all respective coil sub-sets are connected in series. The increased number of turns in each coil increases the overall inductance of the motor. This means that for a given power requirement lower currents can be used in the coils of each coil sub-set, which leads to fewer heat dissipation problems, and which allows smaller switching devices to be used. The use of smaller switching devices in turn allows for faster switching speeds and lower switching losses.

However, for an electric motor having a plurality of independent sub-motors, with each sub-motor having an independent controller for controlling the operation of their respective inverter, and where there is no dedicated synchronisation line between the respective controllers, the PWM control between the respective sub-motors will be unsynchronised. This can result in an increase in DC bus voltage ripple with the need for bigger filter capacitance to maintain the DC bus voltage.

The use of a dedicated synchronisation line between each controller would require the use of at least two additional digital input/output lines on each processor, which would require isolation connections between the two connections. Additionally, to verify the connectivity of the dedicated synchronisation line, some form of internal synchronisation processing would be required to drive and monitor the synchronisation line.

It is desirable to improve this situation.

In accordance with an aspect of the present invention there is provided a control system according to the accompanying claims.

The invention as claimed has the advantage of allowing two electric motor control devices to be synchronised when performing an electric motor function without the need for a dedicated synchronisation signal, thereby allowing the cost, complexity and weight of an electric motor to be reduced.

The present invention will now be described, by way of example, with reference to the accompanying drawings, in which.

The embodiment of the invention described is for a control system for an electric motor, where the electric motor is for use in a wheel of a vehicle. However the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
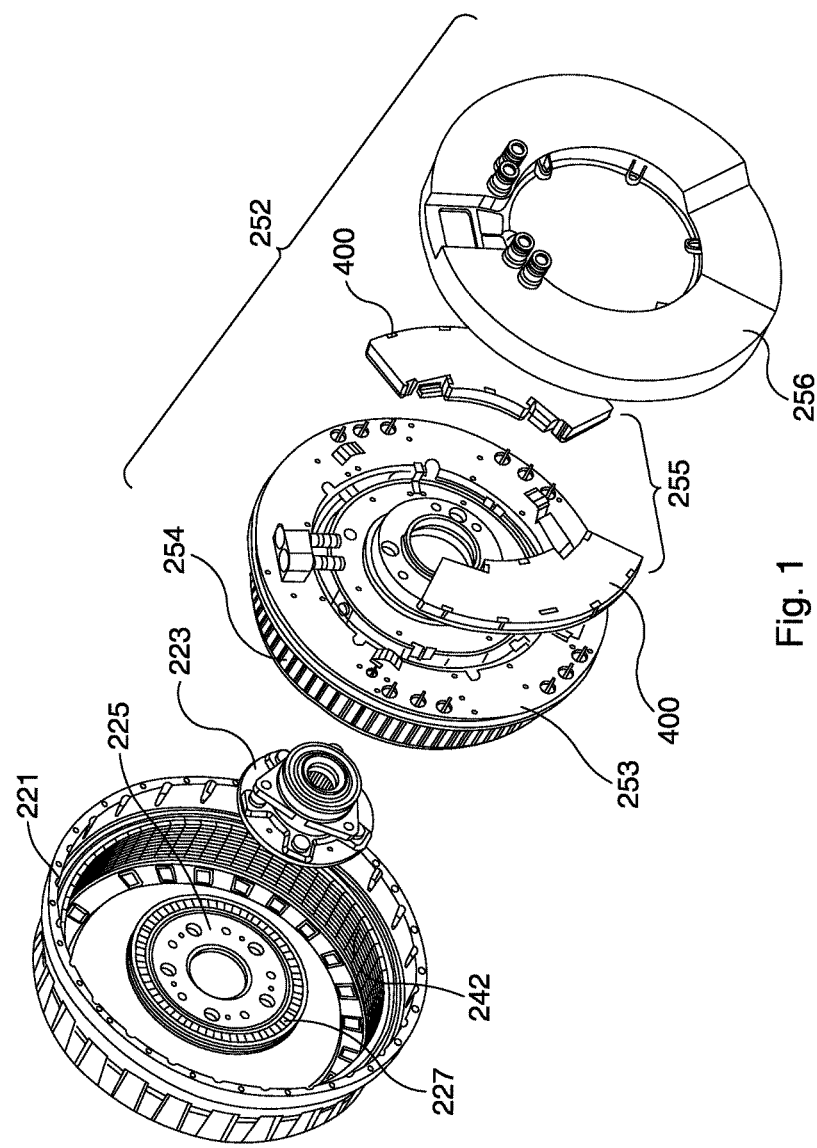
FIG. 1 illustrates an exploded view of an electric motor as used in an embodiment of the present invention.

For the purposes of the present embodiment, as illustrated in FIG. 1, the in-wheel electric motor includes a stator 252 comprising a heat sink 253, multiple coils 254 and an electronics module 255 mounted in a rear portion of the stator for driving the coils. The coils 254 are formed on stator tooth laminations to form coil windings. A stator cover 256 is mounted on the rear portion of the stator 252, enclosing the electronics module 255 to form the stator 252, which may then be fixed to a vehicle and does not rotate relative to the vehicle during use.

Figure 3:
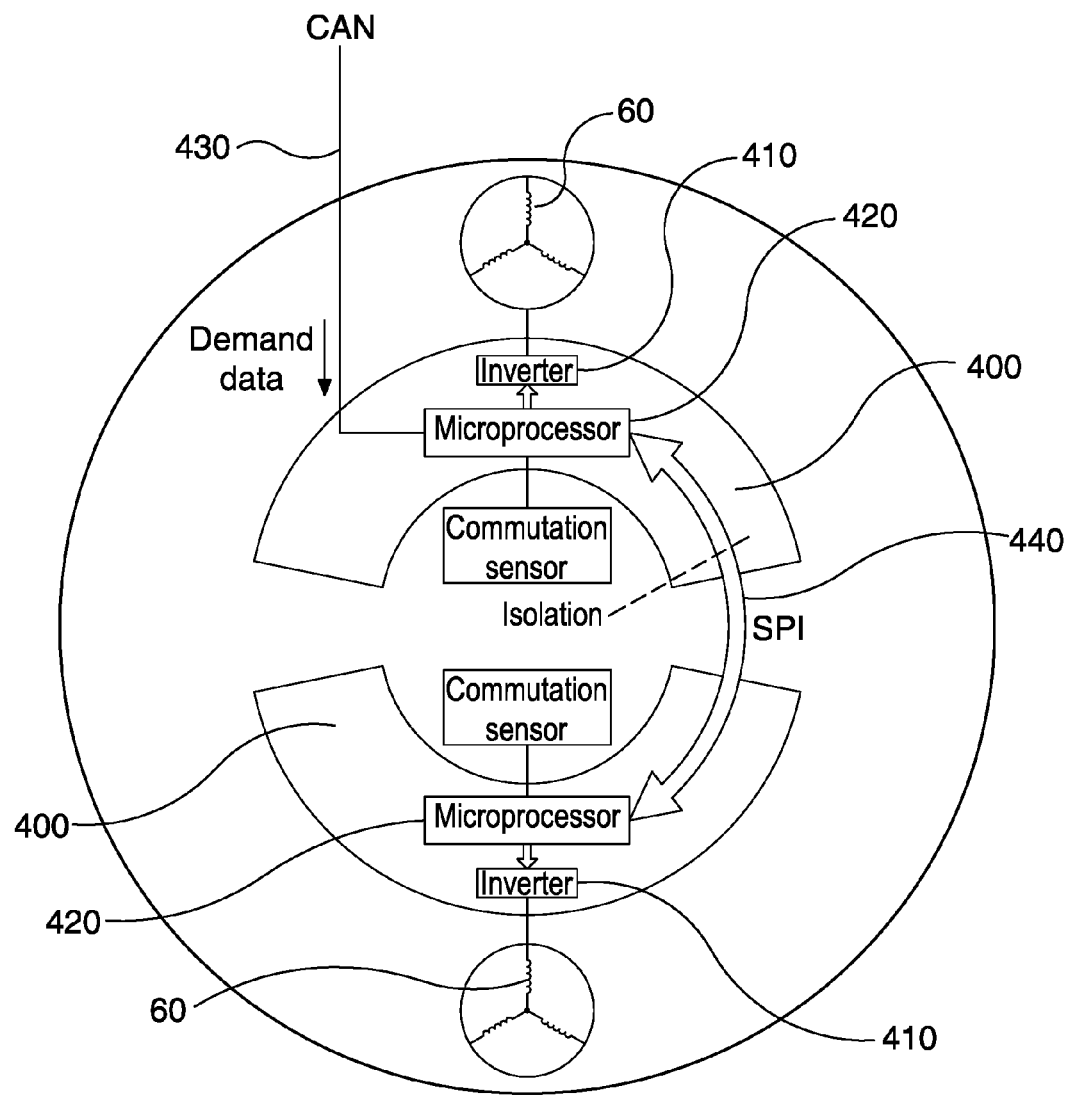
FIG. 3 illustrates an electric motor according to an embodiment of the present invention.

The electronics module 255 includes two control devices 400, where each control device 400 includes an inverter 410 and control logic 420, which in the present embodiment includes a processor, for controlling the operation of the inverter 410, as illustrated in FIG. 3.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 2:
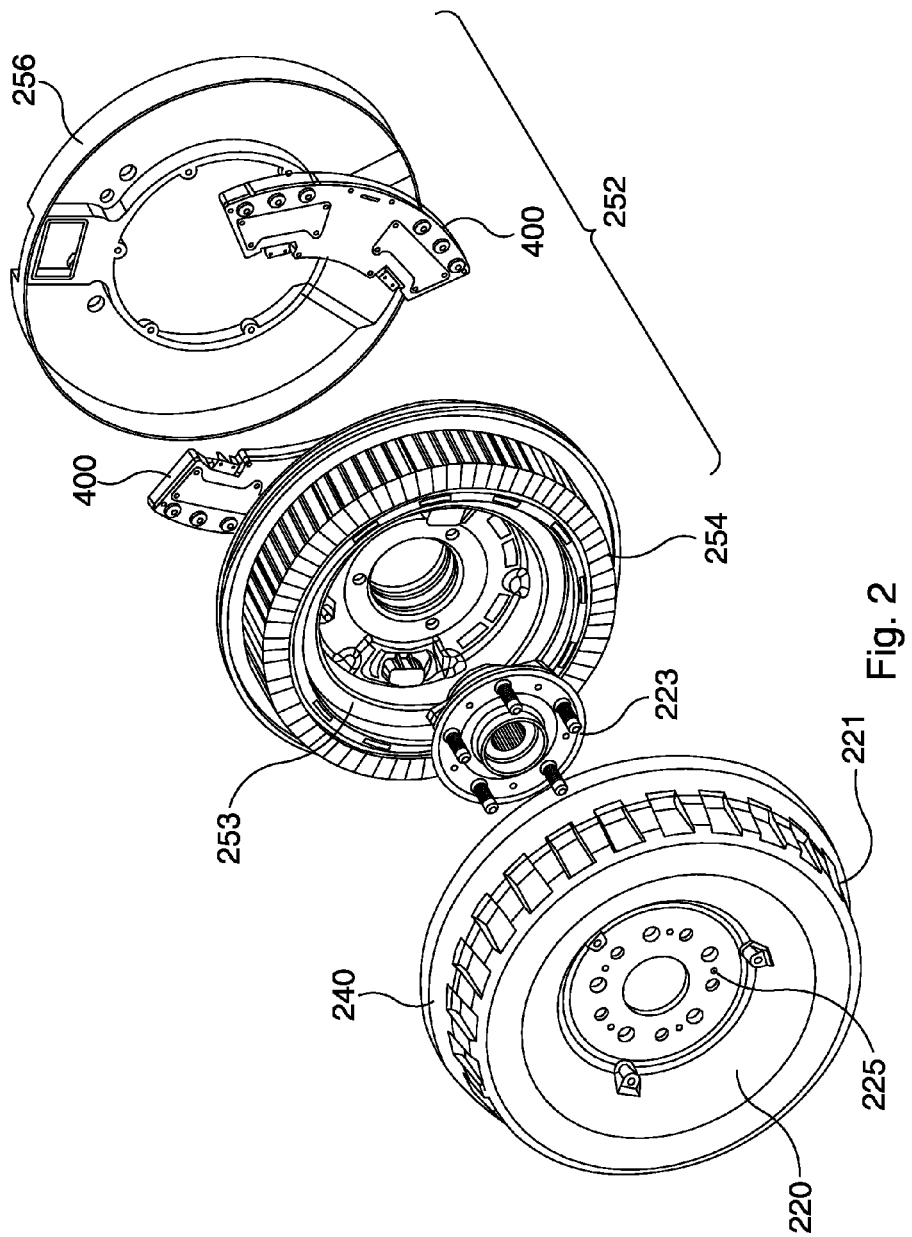
FIG. 2 illustrates an exploded view of the electric motor shown in FIG. 1 from an alternative angle.

FIG. 2 shows an exploded view of the same assembly as FIG. 1 from the opposite side showing the stator 252 and rotor. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improve position detection, preferably the sensor include an associated second sensor placed 90 electrical degrees displaced from the first sensor.

The motor 40 in this embodiment includes two coil sets 60 with each coil set 60 having three coil sub-sets 61, 62, 63 that are coupled in a wye configuration to form a three phase sub-motor, resulting in the motor having two three phase sub-motors. However, although the present embodiment describes an electric motor having two coil sets 60 (i.e. two sub motors) the motor may equally have three or more coil sets with associated control devices (i.e. three or more sub motors). For example in a preferred embodiment the motor 40 includes eight coil sets 60 with each coil set 60 having three coil sub-sets 61, 62, 63 that are coupled in a wye configuration to form a three phase sub-motor, resulting in the motor having eight three phase sub-motors.

FIG. 3 illustrates the connections between the respective coil sets 60 and the control devices 400 housed in the electronics module 255, where a respective coil set 60 is connected to a respective three phase inverter 410 included on a control device 400. As is well known to a person skilled in the art, a three phase inverter contains six switches, where a three phase alternating voltage may be generated by the controlled operation of the six switches.

As stated above, the electronics module 255 includes two control devices 400, with each control device 400 having an inverter 410 that is coupled to a coil set 60. Additionally, each control device 400 includes an interface arrangement, where in a first embodiment the interface arrangement on each control device 400 is arranged to allow communication between the respective control devices 400 housed in the electronics module 255 via a communication bus with one control device 400 being arranged to communicate with a vehicle controller mounted external to the electric motor. The processor 420 on each control device 400 is arranged to handle communication over the interface arrangement, as described in detail below.

The processors 420 on the respective control devices 400 are arranged to control the inverter 410 mounted on the respective control device 400 to allow each of the electric motor coil sets 60 to be supplied with a three phase voltage supply, thereby allowing the respective coil sub-sets 61, 62, 63 to generate a rotating magnetic field. Although the present embodiment describes each coil set 60 as having three coil sub-sets 61, 62, 63, the present invention is not limited by this and it would be appreciated that each coil set 60 may have one or more coil sub-sets.

Under the control of the respective processors 420, each three phase bridge inverter 410 is arranged to provide PWM voltage control across the respective coil sub-sets 61, 62, 63, thereby generating a current flow in the respective coil sub-sets for providing a required torque by the respective sub-motors.

As stated above, PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets 61, 62, 63.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit.

Using PWM switching, the plurality of switches are arranged to apply an alternating voltage across the respective coil sub-sets, where as stated above the phase angle and voltage envelope for each of the different electrical signals are generated by the respective control devices using PWM voltage control. The voltage envelope and phase angle of the electrical signals is determined by the modulating voltage pulses.

Figure 4A:
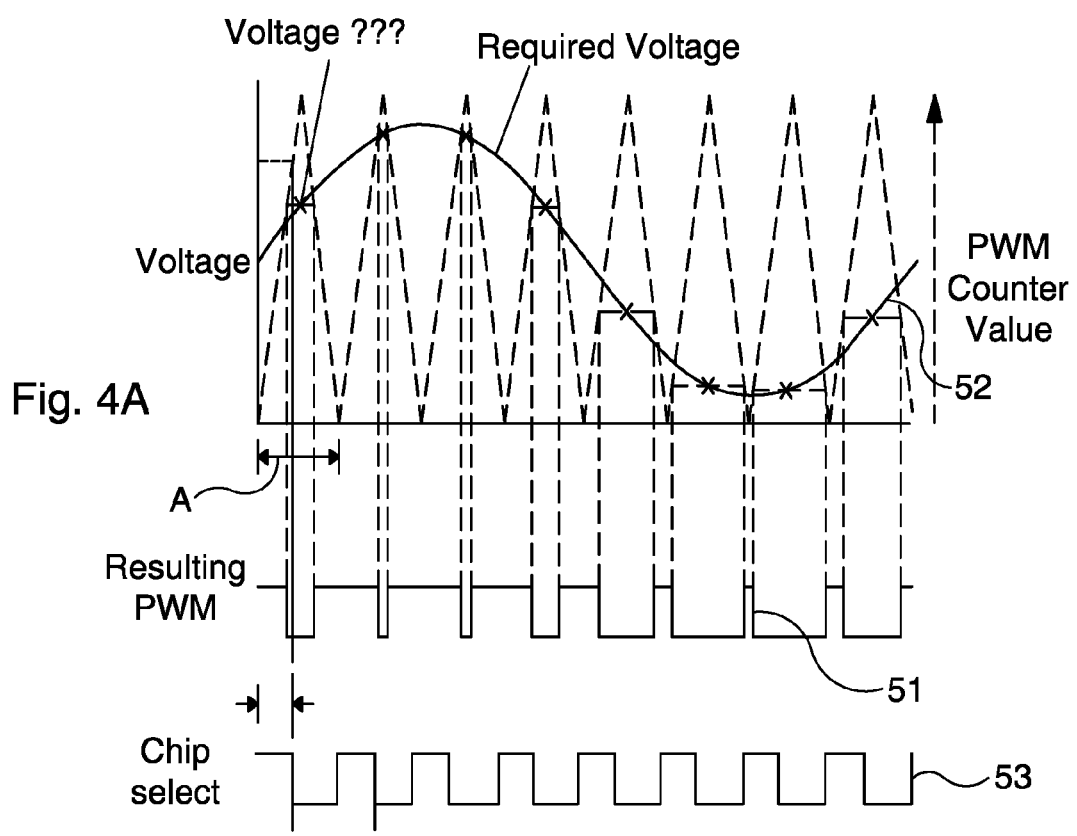
FIG. 4a illustrates PWM voltage control for a single voltage phase in an electric motor according to an embodiment of the present invention.

An illustration of PWM voltage control for a single voltage phase in an electric motor is illustrated in FIG. 4a, where the modulated PWM pulses 51 result in a sine like voltage being formed across coil windings of an electric motor to form a voltage envelope 52 with a given phase angle. The smoothness of the resultant waveform can be controlled by varying the width and number of modulation pulses. The PWM modulation period is illustrated in FIG. 4a by the time period A.

For the purposes of the present embodiment, the PWM voltage control is arranged to have a modulation period of 62.4 μsec, which provides a PWM modulation rate of approximately 16 kHz. However, any suitable PWM modulation rate may be used.

To control the timing of the PWM modulation rate, the processors 420 on each of the control devices 400 include a PWM counter. The PWM counters are arranged to cycle through a count range of 0 to n, where n can be of any value, however, for the purposes of the present embodiment the value of n is 1247. The time taken to cycle from 0 to 1247 takes approximately 62.4 μsec, which corresponds to the PWM modulation period for the present embodiment. A PWM pulse is switched on and off at specified count values based upon the PWM duty cycle. For example, if the PWM duty cycle is 50 percent a PWM pulse would be switched on at a count value of 312 and switched off at a count value of 935. That is to say, the PWM pulse is switched on for 50 percent of the PWM modulation period.

As described above, the voltage modulation depth of a series of PWM pulses determines the voltage phase angle and voltage envelope formed across the respective electric motor coils.

Although the present embodiment utilizes a PWM counter to control the PWM modulation period, as would be appreciated by a person skilled in the art, other techniques for controlling the PWM modulation period may be used. If a PWM counter is used to control the PWM modulation period any suitable count range may be used.

As described above, the plurality of switches are configured to form a three phase bridge circuit. As is well known to a person skilled in the art, the number of switches will depend upon the number of voltage phases to be applied to the respective sub motors. Although the current design shows each sub motor having a three phase construction, the sub motors can be constructed to have any number of phases.

To minimize DC link capacitance and electromagnetic noise the PWM voltage signals generated by each sub motor, which are arranged to provide electrical signals having a voltage envelope with substantially the same phase angle are arranged to be offset with respect to each other. That is to say, even though the voltage envelope for a particular voltage phase generated by different sub motors will have substantially the same phase angle, the PWM pulses used to generate these voltage signals are offset with respect to each other.

Figure 4B:
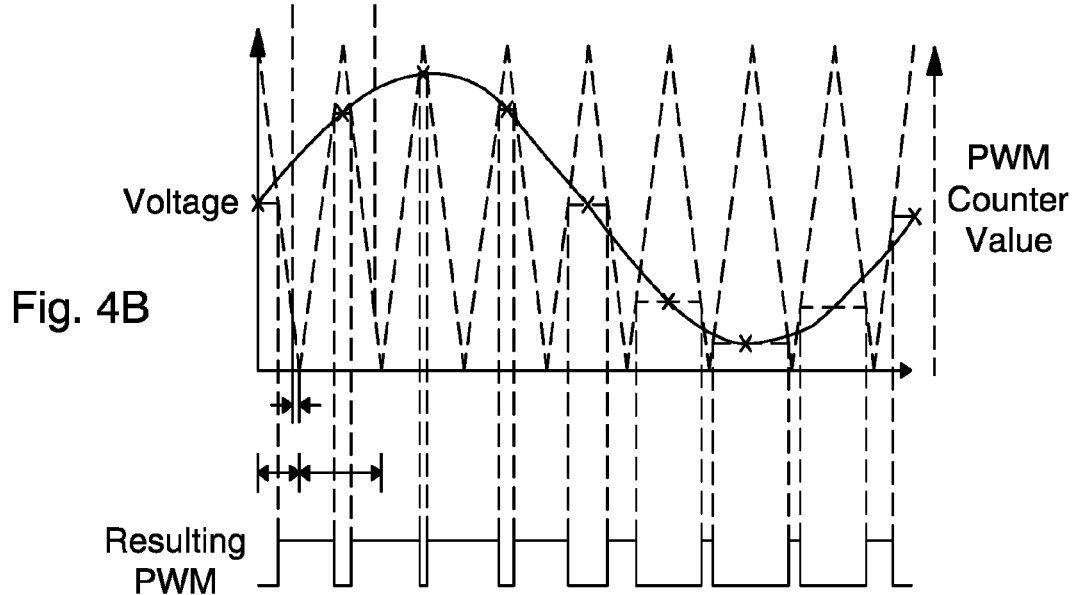
FIG. 4b illustrates phase shifted PWM voltage control for a single voltage phase relative to that illustrated in FIG. 4a in an electric motor according to an embodiment of the present invention.

As illustrated in FIG. 4b, to achieve a PWM offset between different sub-motors the count values between the respective PWM counters are arranged to be offset with respect to each other. $T_{offset}$ in FIG. 4b illustrates the PWM offset relative to the PWM voltage signals in FIG. 4a. That is to say, in FIG. 4a counter value 0 corresponds to $T=0$, whereas in FIG. 4b counter value 0 corresponds to $T=T_{offset}$. By offsetting the PWM counter values, the corresponding PWM signals generated by the respective inverters for electrical signals having a voltage envelope with substantially the same phase angle across the different sub motors are generated using the same PWM counter values, with the relative counter offset causing the PWM signals to be offset. This is illustrated in FIG. 4a and FIG. 4b, where the voltage envelope illustrated in FIGS. 4a and 4b have substantially the same phase and amplitude but are generated with offset PWM voltage signals.

This has the effect of phase shifting the respective PWM voltage pulses generated by each inverter on the respective sub motors. Accordingly, even though the voltage envelope for different voltage signals generated by the inverters will have substantially the same phase angle, the PWM signals used to generate these voltage signals will not have substantially the same phase angle, thereby helping to minimize DC link capacitance and electromagnetic noise.

However, if during PWM voltage control the operation of the PWM counters mounted on the different control devices 400 are not synchronised, the PWM counters will move in and out of phase. This will result in an increase in the required DC link capacitance and electromagnetic noise when the PWM signals temporarily become in phase.

The mechanism for synchronizing the PWM counters on the different sub motors is described in detail below, where the synchronization is performed using the communication bus coupled between both control devices.

In the present embodiment, one of the control devices 400 included in the electronics module 255, designated the master control device, is arranged to receive torque demand requests over a communication line from an external vehicle controller. The torque demand requests received at the master control device 400 is transmitted by the master control device 400 to the other control device 400 housed in the electronics module 255, designated the secondary control device, over a different communication bus, which in the present embodiment is a serial peripheral interface SPI bus, as described below. Optionally, status information may also be provided from the control devices 400 to the external vehicle controller.

To allow the master control devices 400 to communicate with an external vehicle controller, the interface arrangement for the master control device 400 includes a controller area network CAN interface for allowing the master control device 400 to communicate with the external vehicle controller over a CAN bus 430.

To allow the master control device 400 and the secondary control device 400 to communicate over an SPI bus the interface arrangement for both control devices 400 housed within the electronics module 255 includes an SPI device for allowing communication between both electronics module control devices over the SPI buses 440.

As is well known to a person skilled in the art, a CAN bus is a multi-master broadcast half duplex serial bus and a SPI bus is a synchronous serial data link standard that operates as a full duplex bus.

Although the present embodiment describes the use of a CAN bus for communicating between a control device 400 and an external vehicle controller and an SPI bus for communicating between two control devices 400 housed within an electronics module, the present invention is applicable for use with other types of communication buses where for the bus between the master control device 400 and the secondary control device 400 it is possible to control the timing of the active/inactive state of the bus.

In a first mode of operation, the vehicle controller is arranged to transmit a torque demand request to the master control device 400 over the CAN bus 430. The torque demand request transmitted over the CAN bus 430 corresponds to the total torque that the electric motor is required to generate based upon a drivers input, for example based on a throttle demand generated within the vehicle.

Preferably, the control data transmitted over the CAN bus 430 by the vehicle controller also include an enable signal, where the enable signal is arranged to enable or disable the motor depending upon whether the enable signal has been set active or inactive.

Other data may also be communicated over the CAN bus 430.

The master control device 400 is arranged to read the enable signal and total torque demand request communicated over the CAN bus 430. The master control device 400 is arranged to communicate the data received over the CAN bus, that is to say the total torque demand request, over the SPI bus 440 to the secondary control device 400.

The SPI bus includes four logic signals: i) serial clock generated by the master device, ii) serial bus data in, iii) serial bus data out, and iv) chip select.

To begin the transmission of data from the master control device 400, over the SPI bus, to the secondary control device 400, the master control device 400 configures the clock rate of the SPI bus.

When the master control device 400 is ready to transmit data to the secondary control device 400, the master control device 400 sets the chip select to a logic 0, where the chip select is active when low and inactive when at logic 1.

The flow of data over the SPI bus from the master control device 400 to the secondary control device 400 is controlled by the processor 420 on the master control device 400, where the master control device processor 420 is arranged to initiate the transmission of data by activating the chip select.

Upon activation of the chip select, the SPI serial clock signal is enabled and data is transmitted over the serial data out line, where the timing of the data is synchronised with the serial clock, as is well known to a person skilled in the art.

To allow the secondary control device PWM modulation period to be synchronised to the master control device PWM modulation period, the processor 420 on the master control device 400 is arranged to transmit data over the SPI bus 440 to the secondary control device 400 in frames having a transmission period corresponding to the PWM modulation period for the electric motor, which in the present embodiment is 62.4 μsec.

Additionally or alternatively, the master control device 400 can be arranged to transmit data over the SPI bus 440 to the secondary control device 400 in frames having a transmission period corresponding to multiples of the PWM modulation period.

The setting of the SPI frame duration to 62.4 μsec is achieved by the processor 420 on the master control device 400 activating the chip select 53 at the same time point within each PWM modulation period, which in the present embodiment corresponds to the same PWM counter value within each PWM modulation period, as illustrated in FIG. 4a.

To ensure that the activation of the chip select is synchronised with the PWM counter on the master control device 400 the chip select is activated in response to an interrupt signal issued by the PWM counter at a predetermined counter value, which corresponds to a specified time period Tcs after the start of a PWM modulation period, where the predetermined time period Tcs is also stored on the secondary control device. Any counter value for Tcs may be used. Alternatively, the predetermined PWM counter value used by the processor 420 on the master control device 400 for activating the SPI chip select may also be stored on the secondary control device to allow the secondary control device 400 to determine the time period Tcs used by the master control device 400.

Within 62.4 μsec of the chip select being activated, the processor 420 on the master control device 400 deactivates the chip select, thereby ensuring that the chip select activation period is less than 62.4 μsec. The chip select is reactivated at the same PWM counter value in the next PWM modulation period (i.e. 62.4 μsec after the previous chip select activation).

The processor 420 on the secondary control device 400 is arranged to determine the timing of the PWM counter on the master control device 400 using the time at which the chip select is activated by the processor 420 on the master control device 400 in conjunction with the predetermined time period Tcs that the interrupt is generated by the processor 420 on the master control device 400. That is to say, the start of a new PWM counter cycle can be determined by the processor 420 on the secondary control device 400 by subtracting the predetermined time Tcs from the activation time of the chip select. Upon determining the timing of the PWM counter on the master control device 400 the processor 420 on the secondary control device 400 is arranged to synchronise the operation of the PWM counter on the secondary control device 400 to the PWM counter on the master control device 400.

As stated above, to minimize DC link capacitance and voltage ripple, the PWM voltage signals generated by the inverter 410 on the master control device 400 and the inverter 410 on the secondary control device 400 are arranged to be offset, where the processor 420 on the master control device 400 and the processor 420 on the secondary control 400 are preconfigured to apply a predetermined offset with respect to each of the PWM counters.

If the software enable signal communicated over the CAN bus 430 from the external vehicle controller has been set to active, the processor 420 on the master control device 400 is arranged to control the inverter switches on the master control device 400 to control current flow in the coil set 60 coupled to the master control device 400, where the current flow is controlled to provide a required drive torque based on the torque demand transmitted over the CAN bus 430. In particular, for the present embodiment, where the current flow through the plurality of coil sets 60 is controlled using two control devices 400, the master control device 400 is arranged to control current flow in the coil set 60 coupled to the master control device 400 to generate half the total torque demand received over the CAN bus 430. Correspondingly, using the torque data transmitted over the SPI bus, the processor 420 on the secondary control device 400 is arranged to control the inverter switches on the secondary control device 400 to control current flow in the coil set 60 coupled to the secondary control device 400 so that the other half of the total torque demand request transmitted by the external vehicle controller is generated by the secondary control device 400.

Although the present embodiment illustrates each of the control devices 400 within the electronics module 255 being preconfigured to provide half of the total torque demand request transmitted over the CAN bus 430 by the vehicle controller, any predetermined ratio may be used. For example, for an electric motor having four control devices the predetermined ratio for each control device may be a quarter of the total torque demand request.

Alternatively, the ratio of total torque demand request generated by the respective control devices 400 may be dynamically allocated, for example using the external vehicle controller or set by one of the control devices 400.

Although the present embodiment describes an electric motor having an electronic module that includes two control devices, with each control device arranged to drive a coil set using a processor to control the operation of an inverter, the electronic module may have two or more control devices where each control device is arranged to include one or more inverters for driving one or more coil sets. For example, in a preferred embodiment the electronic module for an electric motor includes two control devices where each control device includes a single processor arranged to control the operation of two inverters, where each inverter is coupled to two coil sets connected in parallel with the star points of the respective parallel coil sets being electrically isolated.

Figure 5:
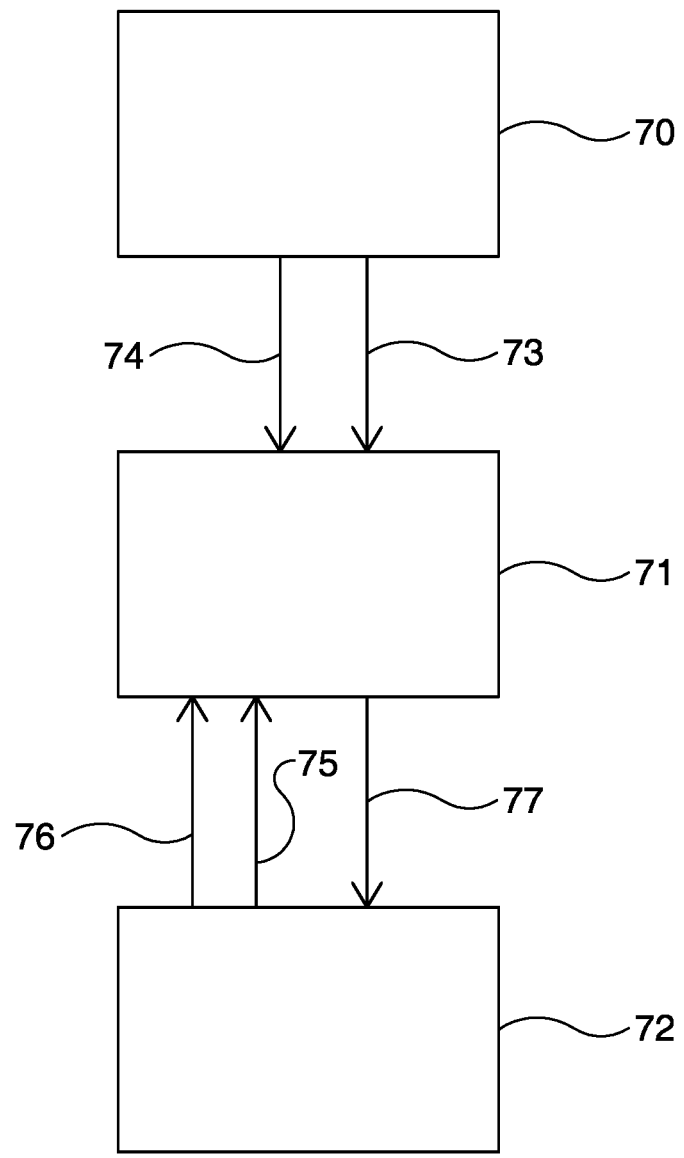
FIG. 5 illustrates a second drive arrangement for an electric motor according to an embodiment of the present invention.

FIG. 5 illustrates an alternative embodiment of the present invention, in which the electric motor includes three control devices; a master control device 70, a secondary control device 71 and a third control device 72. The third control device 72 may act either as a secondary control device or as a back-up master control device. As with the previous embodiment, each control device is arranged to control current flow in at least one coil set using PWM voltage control via the operation of at least one inverter, as described above.

The master control device 70 is coupled to the secondary control device 71 via a first SPI bus with the secondary control device 71 being couple to the third control device 72 via a second SPI bus.

The master control device 70, the secondary control device 71 and the third control device 72 each have at least one PWM counter for controlling the timing of the PWM voltage control applied to the respective coil windings. The respective PWM counters are arranged to operate in the same manner as for the previous embodiment.

The master control device 70 is arranged to receive a torque demand request over a CAN bus from a vehicle controller. The torque demand request transmitted over the CAN bus corresponds to the total torque that the electric motor is required to generate based upon a drivers input, for example based on a throttle demand generated within the vehicle.

Preferably, the control data transmitted over the CAN bus by the external vehicle controller also includes an enable signal, where the enable signal is arranged to enable or disable the motor depending upon whether the enable signal has been set active or inactive.

Other data may also be communicated over the CAN bus.

The master control device 70 is arranged to read the enable signal and total torque demand request communicated over the CAN bus. The master control device 70 is arranged to communicate the data received over the CAN bus, that is to say the enable signal and total torque demand request, over the first SPI bus to the secondary control device 71.

To begin the transmission of data from the master control device 70 over the SPI bus to the secondary control device 71, the master control device 70 configures the clock rate of the SPI bus.

When the master control device 70 is ready to transmit data to the secondary control device 71, the master control device 70 sets the chip select line 73 of the first SPI bus to a logic 0, where the chip select is active when low and inactive when at logic 1.

As with the previous embodiment, the flow of data from the master control device 70 to the secondary control device 71, over the first SPI bus, is controlled by a processor on the master control device, where the master control device processor is arranged to initiate the transmission of data by activating the chip select line 73.

Upon activation of the chip select line 73, the first SPI bus's serial clock signal is enabled with data being transmitted over the first SPI bus's serial data out line 74, where the timing of the data is synchronised with the serial clock, as is well known to a person skilled in the art.

As with the previous embodiment, to allow the secondary control device's PWM modulation period to be synchronised to the master control device PWM modulation period, the processor on the master control device 70 is arranged to transmit data over the first SPI bus to the secondary control device 71 in frames having a duration corresponding to the PWM modulation period for the electric motor, that is to say 62.4 μsec. This is achieved by the processor on the master control device 70 activating the chip select line 73 at the same time point within each PWM modulation period, which in the present embodiment corresponds to the same PWM counter value within each PWM modulation period.

To ensure that the activation of the chip select line 73 is synchronised with the PWM counter on the master control device 70 the chip select line 73 is activated in response to an interrupt signal issued by the master control devices PWM counter at a predetermined counter value Tcs, where the predetermined PWM counter value Tcs is also stored on the secondary control device 71. Alternatively, the predetermined PWM counter value used by the processor 420 on the master control device 400 for activating the SPI chip select may also be stored on the secondary control device.

Within 62.4 μsec of the chip select line 73 being activated, the processor on the master control device 70 deactivates the chip select line 73, thereby ensuring that the chip select activation period is less than 62.4 μsec. The chip select line 73 is reactivated at the same PWM counter value in the next PWM modulation period (i.e. 62.4 μsec after the previous chip select activation).

The processor on the secondary control device 71 is arranged to synchronise the PWM counter on the secondary control device 71 to the PWM counter on the master control device 70 using the time at which the chip select line 73 is activated by the processor on the master control device 70 and the specified time Tcs at which the interrupt is generated. Upon determining the timing of the PWM counter on the master control device 70 the processor on the secondary control device 71 is arranged to synchronise the operation of a PWM counter on the secondary control device 71 to those on the master control device 70.

To allow the timing of the PWM counter on the third control device 72 to be synchronised to the timing of the PWM counter on the master control device 70 the third control device 72 is arranged to transmit data over the second SPI bus to the secondary control device 71 in frames having a time duration substantially the same as the PWM modulation period, which in the present embodiment corresponds to 62.4 μsec.

The flow of data over the second SPI bus from the third control device 72 to the secondary control device 71 is controlled by the processor on the third control device 72, where the third control device processor is arranged to initiate the transmission of data by activating the chip select line 75, as described above.

Upon activation of the chip select line 75, the SPI serial clock signal is enabled and data is transmitted over the second SPI bus's serial data out line 76, where the timing of the data is synchronised with the serial clock, as is well known to a person skilled in the art.

As stated above, to allow the third control device's PWM modulation period to be synchronised to the master control device's PWM modulation period, the processor on the third control device 72 is arranged to transmit data over the second SPI bus to the secondary control device 71 in frames having a duration of 62.4 μsec, which corresponds to the PWM modulation period for the electric motor. This is achieved by the processor on the third control device 72 activating the chip select at the same time point within each PWM modulation period, which in the present embodiment corresponds to the same PWM counter value within each PWM modulation period.

To ensure that the activation of the chip select is synchronised with the PWM counter on the third control device 72 the chip select is activated in response to an interrupt signal issued by the PWM counter at a specified time T3*cs* corresponding to a predetermined counter value, where the specified time T3*cs* is also stored on the secondary control device 71.

Within 62.4 μsec of the chip select being activated, the processor on the third control device 72 deactivates the chip select, with the chip select being reactivated at the same PWM counter value in the next PWM modulation period (i.e. 62.4 μsec after the previous chip select activation). While the chip select is activated data may be transmitted from the third control device 71 to the secondary control device 71, for example status data and/or phase angle data.

The processor on the secondary control device 71 is arranged to determine the timing of the PWM counter on the third control device 72 using the time at which the chip select is activated by the processor on the third control device and the specified time T3*cs* from the interrupt being generated by the processor on the third control device, in a similar manner as that used by the second control device 71 for determining the timing of the PWM counter on the master control device 70.

Having determined the timing of the PWM counter on the third control device 72, the second control device 71 compares this timing with the timing of the PWM counter on the master control device 70 and transmits data to the third control device 72 over the second SPI bus's serial bus data in line 77 to indicate any timing differences between the PWM counter on the master control device 70 and the PWM counter on the third control device 72, thereby allowing the third control device 72 to modify the timing of its PWM counter to allow the PWM voltage control on the third control device 72 to operate in synchronization with the master control device 70.

As with the previous embodiment, to minimize DC link capacitance and electromagnetic noise the PWM counters on the respect control devices 70, 71, 72 may be offset with respect to each other.

It will be apparent to those skilled in the art that the disclosed subject matter may be modified in numerous ways and may assume embodiments other than the preferred forms specifically set out as described above, for example the SPI bus may be replace with any communication bus that allows the timing of data transmitted over the bus to be synchronised with the operation of an electric motor component.

The invention claimed is:

1. A control system for an electric motor, the control system comprising a first control device arranged to control an operation of a first component of the electric motor; a second control device arranged to control an operation of a second component of the electric motor, wherein the first control device is arranged to transmit to the second control device, over a first communication link, a first signal for indicating the transmission of data over the first communication link to the second control device, wherein the second control device is arranged to use the timing of the first signal to synchronise the operation of the second component with the operation of the first component.

2. A control system according to claim 1, wherein the first component is a first inverter for controlling current flow in a first coil set of the electric motor.

3. A control system according to claim 2, wherein the second component is a second inverter for controlling current flow in a second coil set of the electric motor.

4. A control system according to claim 3, wherein the first communication link is a serial peripheral interface bus.

5. A control system according to claim 4, wherein the first signal is a chip select signal.

6. A control system according to claim 3, wherein the operation of the first inverter and second inverter is controlled using pulse width modulation signals, wherein the timing of the pulse width modulation signals for controlling the second inverter is synchronised to the timing of the pulse width modulation signals for controlling the first inverter using the first signal.

7. A control system according to claim 5, wherein the operation of the first inverter and the second inverter is controlled using pulse width modulation signals, wherein the timing of the pulse width modulation signals for controlling the second inverter is synchronised to the timing of the pulse width modulation signals for controlling the first inverter using the timing of the chip select.

8. A control system according to claim 7, wherein the timing of the pulse width modulation signals for controlling the second inverter is offset with respect to the timing of the pulse width modulation signals for controlling the first inverter.

9. A control system according to claim 1 further comprising a third control device arranged to control an operation of a third component of the electric motor, wherein the third control device is arranged to transmit to the second control device a second signal for indicating the transmission of data over a second communication link to the second control device from the third control device, wherein the second control device is arranged to use the timing of the first signal and second signal to determine a timing correction for allowing the third control device to synchronise the operation of the third component with the operation of the first component.

10. A control system according to claim 9, wherein the second control device is arranged to transmit the timing correction to the third control device over the second communication link.

11. A control system according to claim 9, wherein the third component is a third inverter for controlling current flow in a third coil set of the electric motor.

12. A control system according to claim 9, wherein the second communication link is a serial peripheral interface bus.

13. A control system according to claim 12, wherein the second signal is a chip select signal.

* * * * *